Aug. 30, 1932.  J. JONAS ET AL  1,873,962
RECTIFICATION OF ELECTRIC CURRENT
Filed May 19, 1926
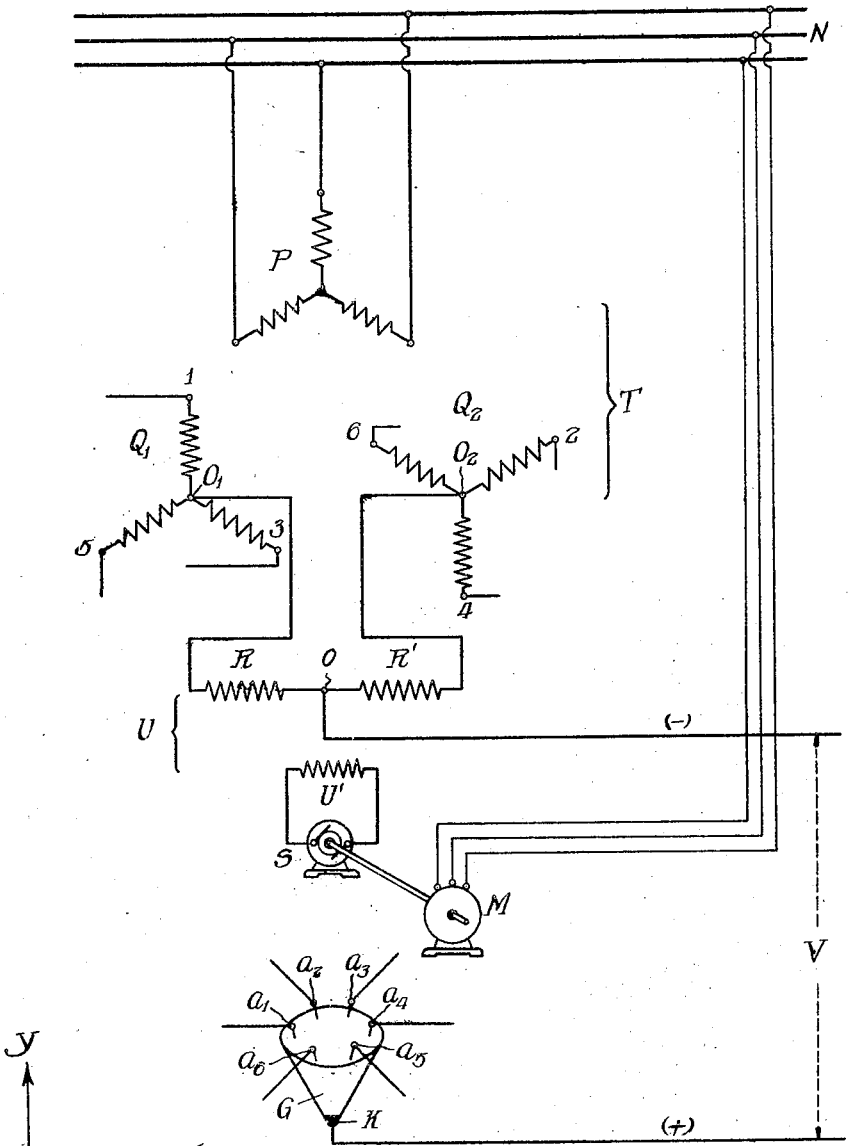
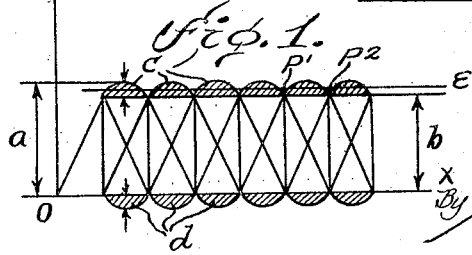
Inventors:
Julius Jonas,
Sigurd Rump, Patented Aug. 30, 1932

1,873,962

UNITED STATES PATENT OFFICE

JULIUS JONAS, OF BADEN, SWITZERLAND, AND SIGURD RUMP, OF BOSTON, MASSACHUSETTS, ASSIGNORS TO AKTIENGESELLSCHAFT BROWN BOVERI & CIE., OF BADEN, SWITZERLAND, A JOINT-STOCK COMPANY OF SWITZERLAND

RECTIFICATION OF ELECTRIC CURRENT

Application filed May 19, 1926, Serial No. 110,127, and in Germany June 20, 1925.

This invention relates to the rectification of alternating current, and pertains particularly to operation of rectifiers of the metallic vapour type, of which mercury vapour rectifiers are an example.

The general object of the invention is the elimination of ripple of pulsating effects in the D. C. output current.

A specific object is the provision of a method and apparatus for the purpose stated, which may be controlled in operation to a certain extent, by the alternating current which is to be rectified, so that their effects may be held to the desired timing with respect to the current which tends to produce the undesired effects in the output current.

Other and further objects will be pointed out or indicated hereinafter, or obvious to one skilled in the art upon an understanding of the invention.

In the drawing forming a part of this specification we show one arrangement of apparatus in which the invention may be embodied and practiced, but as this is presented for illustration only, the claims are not to be construed as limited to this particular arrangement.

In the drawing, Figure 1 is an operation diagram illustrating the elimination of ripple effects in accordance with the invention, and Figure 2 is a diagram of a metallic vapour rectifier installation, including a three to six phase transformer for supplying the six anodes of the rectifier, and wave-modifying means effective on the anode circuits.

The presence of a voltage ripple on the D. C. side of rectifier apparatus is due to the fact that the direct current is the sum of a series of sinusoidal half waves of the same sign and displaced from one another with regard to time. The ripple is thus formed by the crests of the sine waves. The frequency of the main ripple may be found by determining the number of times the D. C. voltage varies from a mean value during a complete cycle of the fundamental wave of the impressed current. The frequency of the ripple is then equal to $\frac{m}{2}$ times the above number of variations, from the mean value per complete cycle of the fundamental wave, i. e., to $m$ times the number of peaks or crests per complete cycle of said fundamental wave, $m$ indicating the number of phases of the rectifier. The curve of these variations is not sinusoidal, and thus in addition to the main ripple there are a series of higher harmonics superimposed on the D. C. voltage. One method of suppressing these ripples, previously employed, has been to inject into the D. C. circuit an E. M. F. having the same frequency as the ripple but of opposite sign. This meant that as many additional E. M. F.'s were required as there were ripple frequencies to be suppressed, and involved complications in apparatus.

The present invention affords a more simple method and means for overcoming the difficulty. This consists in injecting an alternating E. M. F. into the rectifier circuit, this E. M. F. being produced by rectifying an alternating voltage having a frequency higher than that of the fundamental wave of the impressed current but lower than that of the main ripple in the D. C. current, its amplitude and phase with regard to the fundamental being chosen so that the resultant of these two E. M. F.'s, the fundamental and the injected E. M. F., is a wave flattened in shape. The summation of the rectified, flattened, half waves then gives a practically constant voltage on the D. C. side. This flattening of the original sinusoidal half waves may be accomplished for example, by impressing on the anode circuit an additional E. M. F. produced by rectifying an alternating current having a frequency of half that of the main ripple and so placed in phase relationship that each crest of the sinusoidal fundamental is opposed by a half wave of the additional E. M. F., the amplitude of the latter being approximately equal to the height of the crest of the fundamental wave above the point where the phases overlap. The frequency of the voltage which is rectified to produce the additional E. M. F. impressed on the anode circuit is preferably $\frac{m}{2}$ times the fundamental frequency of the rectifier, $m$ indicating the number of phases of the rectifier. The additional E. M. F. may be generated in any desired way and introduced directly into the rectifier circuit, where it is distributed among the anodes.

In Figure 1, $a$ indicates the alternating voltage induced in the secondary winding of a six-phase transformer supplying a rectifier, and $c, c, \ldots$ indicate the series of sine-shaped peaks or crests on the pure direct voltage $b$. The mean value of the direct voltage is indicated by the line $e$, and intersection points of two adjacent crests with line $b$ are indicated by $P_1$ and $P_2$, the heavy line between $P_1$ and $P_2$ showing a variation of the direct voltage from the mean value in the positive direction over the top of one crest, and another variation in the negative direction below the mean value line $e$ to the line of intersection of the crests. It is evident from the figure that the number of peaks or crests is half that of the variations and that the frequency of the ripple corresponds to the number of peaks.

It will be seen from the figure that the peaks or crests $c, c, \ldots$ have the characteristic of rectified waves of an alternating voltage, the frequency of which is equal to $\frac{m}{2}$ times the fundamental frequency of the rectifier, $m$ indicating the number of phases of the rectifier. In accordance with our invention, and in order to suppress the ripples represented by peaks or crests $c, c, \ldots$ we provide in the anode circuit an additional voltage, obtained from the rectification of an alternating voltage of frequency equal to $\frac{m}{2}$, the amplitude and phase position of the additional voltage being so chosen that each peak or crest $c$ of the transformer secondary voltage is opposed by a half-wave $d$ of the additional voltage. The curve of the transformer secondary voltage wave is thereby flattened, and a direct voltage is obtained which has the constant value indicated by the line $b$. The operation may be performed in the manner exemplified in Figure 2, where N represents the three-phase mains, T a transformer supplying the rectifier G, P the primary of this transformer, and $Q_1$ and $Q_2$ the secondaries having star points $O_1$ and $O_2$. The two star points are connected through the secondaries R and R′ of the auxiliary transformer U. The junction O of the windings R and R′ forms the zero point of the entire secondary system, to which the negative wire of the D. C. system V is connected. The positive wire of the D. C. side is connected to the cathode K. The connections between the anodes $a_1, a_2, a_3 \ldots a_6$ and the corresponding terminals 1, 2, 3 .... 6 of the windings $Q_1$ and $Q_2$ are not completely shown in the figure. The primary U′ of the auxiliary transformer U is energized from a synchronous generator S having a frequency which may, for example, be half that of the main ripple. The phase relationship of this injected E. M. F. is controllable. This is accomplished in the example, by driving the generator from a synchronous motor M, the field of which can be regulated at will. As the motor has fewer poles than the generator, a relatively small displacement of the rotor of the driving motor corresponds to a relatively large displacement of the generator rotor. In the case under consideration the frequency of the main ripple is that of the sixth harmonic. The frequency of the generator S is therefore that of the third harmonic, and the number of poles is three times that of the driving motor M. If the motor armature is displaced $\pm 30°$ by altering the field, this will correspond to a displacement of $\pm 90°$ in the generator. By properly choosing the phase and amplitude of the injected E. M. F. the summation of this with the sinusoidal fundamental induced in the windings $Q_1$ and $Q_2$ will give a resultant alternating E. M. F. having a flattened wave form. When rectified, these flattened half waves will then add up to give a practically constant E. M. F. at the D. C. terminals.

When the rectifier is on load, the inductive coupling between the anode circuits will result in a displacement of the ripple, and it is therefore desirable to vary the phase of the injected E. M. F. in accordance with the load. This is most simply accomplished by providing additional excitation for the field of the driving motor, the current for this purpose being either the load current itself or one proportional to it.

What we claim is:—

1. Rectifying apparatus comprising, in combination, a metallic vapour rectifier having an anode circuit, a supply transformer having its secondaries forming a part of the anode circuit, a supplementary transformer having its secondary connected to said anode circuit, a source of alternating current, and means energized therefrom for energizing the secondaries of the supply and supplementary transformers at different frequencies.

2. In a current-rectifying system of the character described, metallic vapour rectifier apparatus having anodes, a polyphase transformer secondary winding supplying said anodes, an auxiliary transformer having a secondary winding connected to said first-named secondary winding, a connection constituting the negative side of a D. C. system and connected to said second-named secondary winding, and a synchronous generator for energizing said auxiliary transformer.

3. In a current-rectifying system of the character described, metallic vapour rectifier apparatus having anodes, star-connected transformer secondary windings supplying said anodes, an auxiliary transformer having a secondary winding connected to the star points of said windings, a connection constituting the negative side of a D. C. system and connected to said winding, and a synchronous generator for energizing said auxiliary transformer.

4. In a current-rectifying system of the character described, metallic vapour rectifier apparatus having anodes, a transformer having a secondary supplying said anodes, an auxiliary transformer having a secondary connected to said first-named secondary, and a synchronous generator for energizing said auxiliary transformer.

In testimony whereof we have hereunto subscribed our names at Zurich, Switzerland, March 19, 1926, and at Boston, Massachusetts, U. S. A., May 4, 1926, respectively.

JULIUS JONAS.
SIGURD RUMP.